(12) United States Patent
Kanaoka

(10) Patent No.: US 6,576,070 B2
(45) Date of Patent: Jun. 10, 2003

(54) FRICTION MATERIAL

(75) Inventor: Jyunji Kanaoka, Hirakata (JP)

(73) Assignee: Exedy Corporation, Neyagawa (JP)

( * ) Notice: Subject to any disclaimer, the term of this patent is extended or adjusted under 35 U.S.C. 154(b) by 64 days.

(21) Appl. No.: 09/874,226

(22) Filed: Jun. 6, 2001

(65) Prior Publication Data

US 2001/0052373 A1 Dec. 20, 2001

(30) Foreign Application Priority Data

Jun. 14, 2000 (JP) .............................. 2000-178228

(51) Int. Cl.$^7$ ................................ F16D 13/62
(52) U.S. Cl. ................ 148/432; 148/320; 428/210; 192/107 M
(58) Field of Search ................ 148/432, 320; 428/210; 192/107 M

(56) References Cited

U.S. PATENT DOCUMENTS 3,835,118 A * 9/1974 Rhee et al. ................ 260/38

FOREIGN PATENT DOCUMENTS

| FR | 1381846 | * 12/1964 |
| GB | 990620 | * 4/1965 |

* cited by examiner

*Primary Examiner*—Sikyin Ip
(74) *Attorney, Agent, or Firm*—Shinjyu Global IP Counselors, LLP

(57) ABSTRACT

A friction material is disclosed to improve the $\mu$-v characteristic of a friction material without using lead or any other harmful substance. The friction material is a metallic friction material that is made of a copper alloy with a graphite content of about 1 to about 20 wt % and a ceramic content of about 1 to about 15 wt %. The graphite has a particle size of about 50 $\mu$m to about 200 $\mu$m and is arranged in a layer-like form. The ceramic has a particle size of 50 $\mu$m to 200 $\mu$m.

14 Claims, 4 Drawing Sheets

Conventional Friction Material

FRICTION MATERIAL

BACKGROUND OF THE INVENTION

1. Field of the Invention

This invention generally relates to a friction material. More specifically, the present invention relates to a cermet friction material or a metallic friction material made of a copper or iron alloy.

2. Background Information

A clutch device of a vehicle is attached to a flywheel on the engine side and functions to switch between a state in which torque is transmitted from the flywheel to a main shaft of a transmission and a state in which the torque is disengaged. The clutch device basically includes a clutch disc assembly and a clutch cover assembly. The clutch disc assembly basically includes a hub, a plate member, and a frictional holding member. The hub is coupled to the main drive shaft that extends from the transmission. The plate member is coupled to the hub in such a manner that it can transmit torque to the hub. The frictional holding member (clutch disc) is fixed to the outer circumference of the plate member. The frictional holding member typically has a ring-shaped plate and a pair of friction facings (friction material) that is fixed to the side surfaces of the plate. Existing friction materials used for the friction facing include copper-based or iron-based metallic friction materials and cermet friction materials.

Metallic friction materials and cermet friction materials utilize the heat resistance and high surface pressure characteristics of metal and are used on the clutch discs of clutch devices in heavy vehicles and race cars. Friction facings made of these friction materials are manufactured by heat-sintering a mixture containing prescribed materials and sintering the mixture to a core plate.

For example, in a copper-based friction material, the main ingredient is copper and the copper is mixed with such additives as graphite and ceramic. Graphite is a lubricating ingredient added to provide smooth operation. Silica and other ceramics are added to improve frictional resistance retention and wear resistance.

A cermet is a monolithic material composed of a hard ceramic component and a binder component. The hard ceramic component can typically comprise a nonmetallic compound or a metalloid. The hard ceramic component may or may not be interconnected in two or three dimensions. The binder component can typically have a metal or alloy that is generally interconnected in three dimensions. The binder component cements the hard component together to form the monolithic material. Each of the monolithic cermet properties is derived from the interplay of the characteristics of the hard component and the characteristics of the binder component. For example, if the hard component or the binder component exhibits ferromagnetic characteristics so might the monolithic cermet.

The metallic friction materials and cermet friction materials described above have excellent heat resistance and wear resistance, but the $\mu$-v characteristic of each has a negative slope. In other words, when the friction material slides along the mating material, the coefficient of friction increases as the relative velocity between the materials decreases. Consequently, when these materials are used on the clutch discs of clutch devices or the brake material of brake devices, sticking and slipping can easily occur. This phenomenon is known as so-called juddering.

In order to alleviate juddering, substances such as lead, which are considered to be harmful, must be contained in the friction material to secure better lubrication. However, out of concern for the environment, there is a demand for a friction material that does not use lead and other harmful substances.

In view of the above, there exists a need for a friction material which overcomes the above mentioned problems in the prior art. This invention addresses this need in the prior art as well as other needs, which will become apparent to those skilled in the art from this disclosure.

SUMMARY OF THE INVENTION

An object of the present invention is to improve the $\mu$-v characteristic of a friction material without using lead and other harmful substances.

The friction material of the present invention is a cermet friction material or a metallic friction material made of a copper alloy or an iron alloy, wherein the material contains about 1 to about 20 wt % of graphite and about 1 to about 15 wt % of ceramic. The graphite has a particle size of about 50 $\mu$m to about 200 $\mu$m and is arranged in a layer-like form. The ceramic has a particle size of about 50 $\mu$m to about 200 $\mu$m.

According to an aspect of the present invention, about 1 to 20 wt % of graphite is included as a lubricating ingredient and about 1 to about 15 wt % of ceramic having a particle size from about 50 $\mu$m to about 200 $\mu$m is included to secure frictional resistance retention and wear resistance. In order to improve the lubrication in comparison to conventional friction materials, the graphite is arranged in a layer-like form. With the graphite arranged in a layer-like form, the layers peel off one by one when the frictional sliding causes the graphite to exfoliate. Therefore, lubrication is maintained even if some of the graphite exfoliates. Conversely, in the case of conventional friction materials containing block-shaped graphite, the sliding surface becomes rough and lubrication is greatly reduced when the graphite exfoliates.

The particle size of the graphite is set to about 50 $\mu$m to about 200 $\mu$m because it is extremely difficult to arrange the graphite in a layer-like form if the particle size is smaller than about 50 $\mu$m. Further, there is too much slipping if the particle size is larger than about 200 $\mu$m. Thus, by arranging the graphite in a layer-like form, the friction material described in this claim is able to improve the lubrication in comparison with conventional friction materials and improve the $\mu$-v characteristic of the friction material without including lead or other harmful substances. Moreover, the $\mu$-v characteristic of the frictional material can be given a positive slope by adjusting the content and particle size of the graphite. When the $\mu$-v characteristic of the friction material has a positive slope, it is more difficult for juddering to occur.

According to another aspect of the present invention, the graphite of the friction material of the present invention is preferably natural graphite. Roughly speaking, graphite can be divided into natural graphite and artificial graphite. In this aspect of the present invention, natural graphite, which is easy to arrange in layer-like form (readily assumes a layer-like form), is contained in the friction material as a lubricating substance.

According to another aspect of the present invention, the ceramic of the frictional material of the present invention is a single substance made of silica, mullite, or zircon sand or a composite containing at least two of silica, mullite, and zircon sand.

These and other objects, features, aspects and advantages of the present invention will become apparent to those

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

OVERVIEW OF THE FRICTION MATERIAL

A friction material in accordance with one embodiment of the present invention preferably includes a metallic friction material, a graphite material, and a ceramic material (friction adjusting material). Of course, other material known to be used in a friction material can also be included so long as they do not substantially change the characteristics of the present invention. The metallic friction material preferably includes a metal matrix made of a copper alloy or an iron alloy. More preferably, the metallic friction material includes a metal matrix made of a copper alloy that is about 80% copper. This embodiment preferably uses natural graphite as the lubricating ingredient for providing smooth operation. The natural graphite has a particle size of about 50 $\mu$m to about 200 $\mu$m and a content of about 1 wt % to about 20 wt %. Preferably, the natural graphite has a particle size of about 80–150 $\mu$m and a content of about 8 wt %. Preferably, a ceramic material is used as a friction adjusting material in the friction material of the present invention to improve the frictional resistance retention and the wear resistance. The ceramic material (friction adjusting material) is preferably a single substance made of silica, mullite, or zircon sand or a composite containing at least two of silica, mullite, and zircon sand. This ceramic material (friction adjusting material) has a particle size of about 50 $\mu$m to about 200 $\mu$m and a content of about 1 wt % to about 15 wt %. Preferably, the ceramic material (friction adjusting material) is a single substance made of silica, and has a particle size of about 90–150 $\mu$m and a content of about 5 wt %.

This friction material of the present invention is especially useful as a friction facing of a clutch.

In the manufacturing process, first, the copper or iron powder, the graphite powder, and the ceramic powder are all mixed together. Next, the powder mixture is compressed under high pressure at room temperature to form an intermediate friction member. Finally, the compressed powder (intermediate friction member) is sintered at a high temperature in a reducing atmosphere in accordance with a conventional sintering process.

ARRANGEMENT OF THE GRAPHITE IN THE FRICTION MATERIAL

Figure 1:
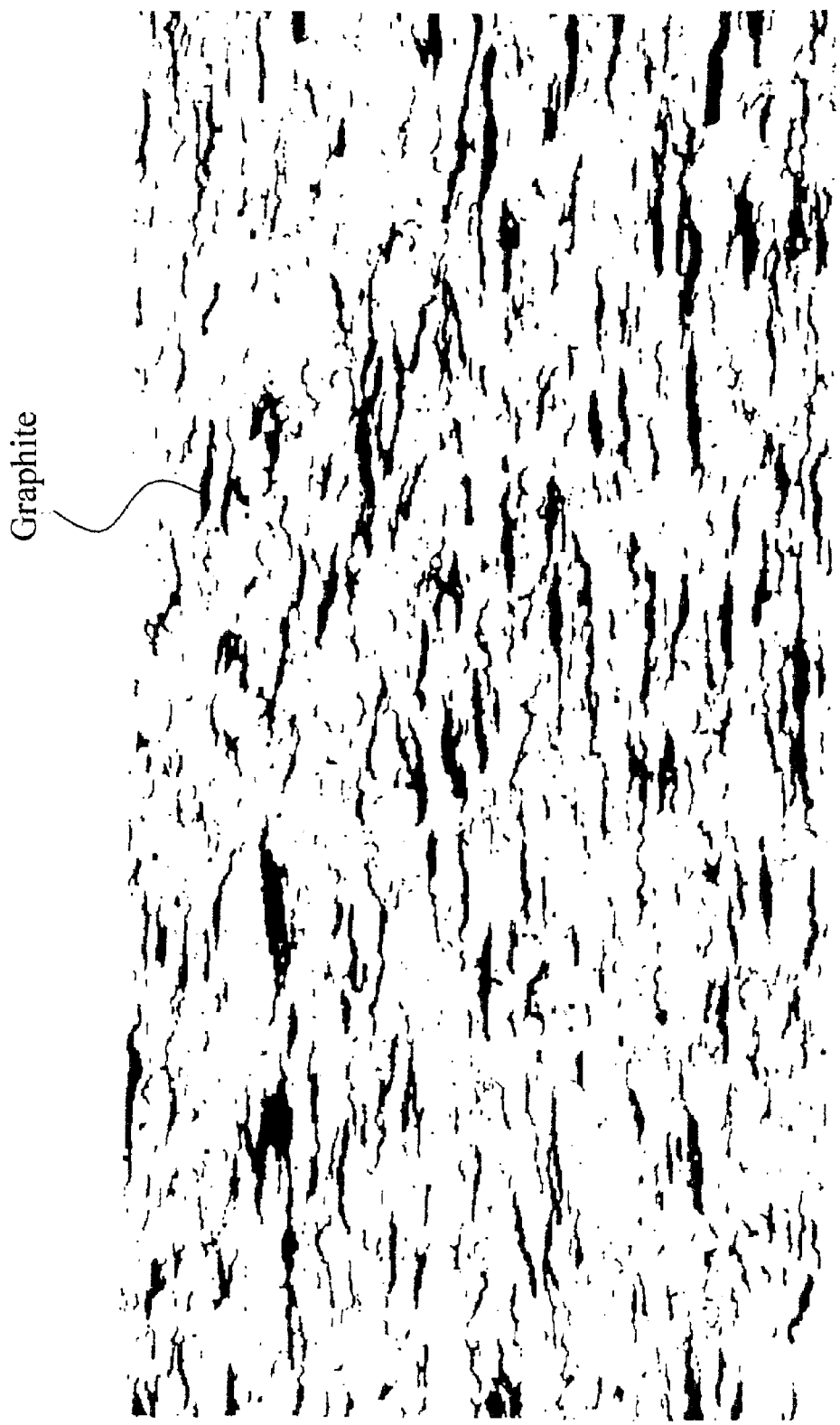
FIG. 1 is a pictorial cross sectional view of a friction material that is constructed in accordance with the present invention.

A friction material manufactured in accordance with one embodiment of the present invention is shown in FIG. 1. Fish scale-shaped natural graphite is arranged in a layer-like form in the friction material. The graphite is oriented in a horizontal direction as seen in FIG. 1 that corresponds to the direction in which the friction material slides against the mating material when it is used.

Figure 2:
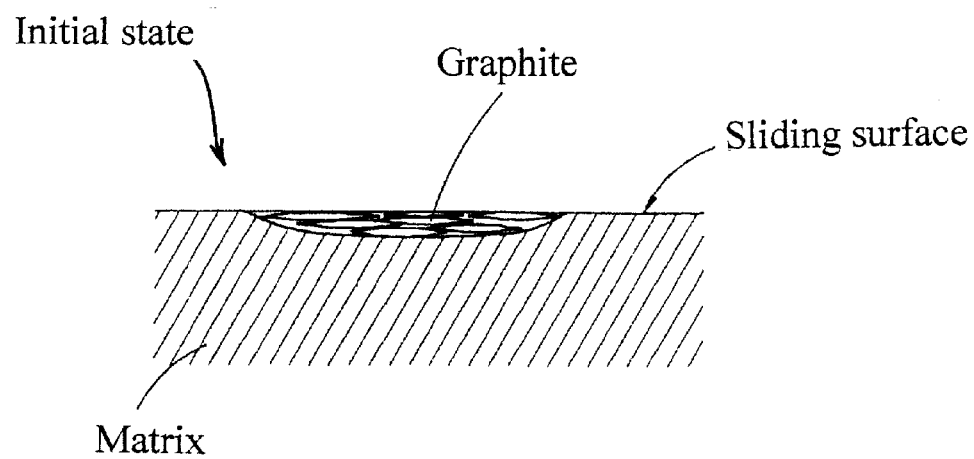
FIG. 2 is a schematic cross sectional view of a friction material in accordance with the present invention in which fish scale-shaped graphite is arranged in a layer-like form.
Figure 3:
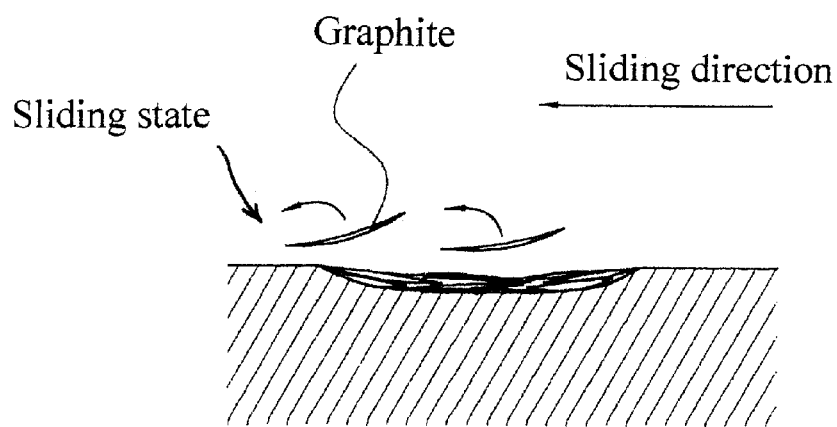
FIG. 3 is a schematic cross sectional view of a friction material in accordance with the present invention in which fish scale-shaped graphite is arranged in a layer-like form.

FIG. 2 is a schematic view of the cross sectional structure of a friction material in accordance with the present invention that has fish scale-shaped graphite arranged in a layer-like form. The fish scale-shaped graphite is layered along the sliding surface. As shown in FIG. 3, the graphite gradually exfoliates in a layer-like form when the friction material slides against the mating material. Since the graphite exfoliates in layer-like form, as shown in FIG. 3, the lubricating effect is maintained for a long time and marked increases in surface pressure do not occur. Thus the friction material of the present invention is effective with respect to wear resistance and retention of frictional performance.

Figure 4:
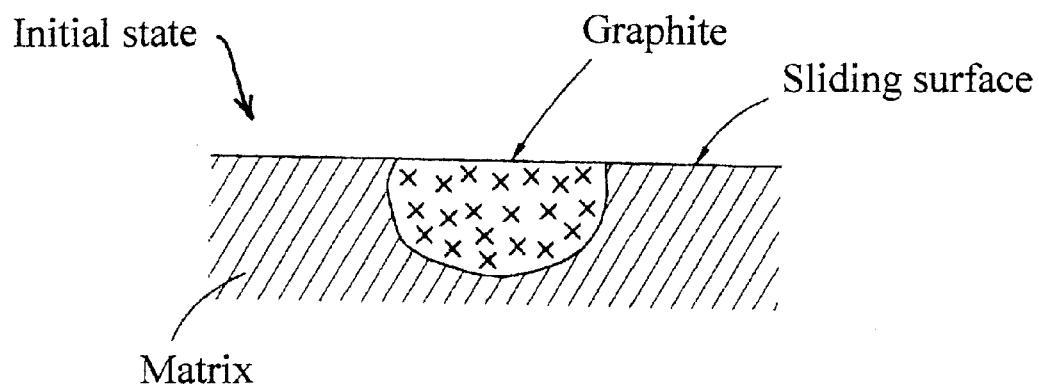
FIG. 4 is a schematic cross sectional view of a conventional friction material.
Figure 5:
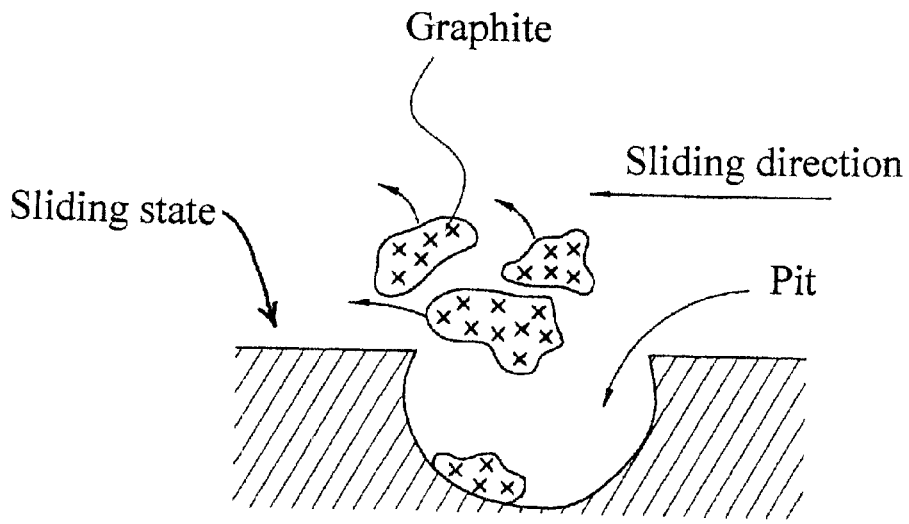
FIG. 5 is a schematic cross sectional view of a conventional friction material illustrating the graphite being crushed into particles or chunks and falling out of the matrix when the friction material slides against the mating material.

Conversely, in the case of a conventional friction material having a cross sectional structure like that shown in FIG. 4, the graphite is crushed into particles or chunks and falls out of the matrix as shown in FIG. 5 when the friction material slides against the mating material. Consequently, pits are formed in the friction material and the increased surface pressure and uneven surface roughness hasten wear.

COMPARISON OF THE CONVENTIONAL FRICTION MATERIAL AND THE FRICTION MATERIAL OF THE PRESENT INVENTION

Figure 6:
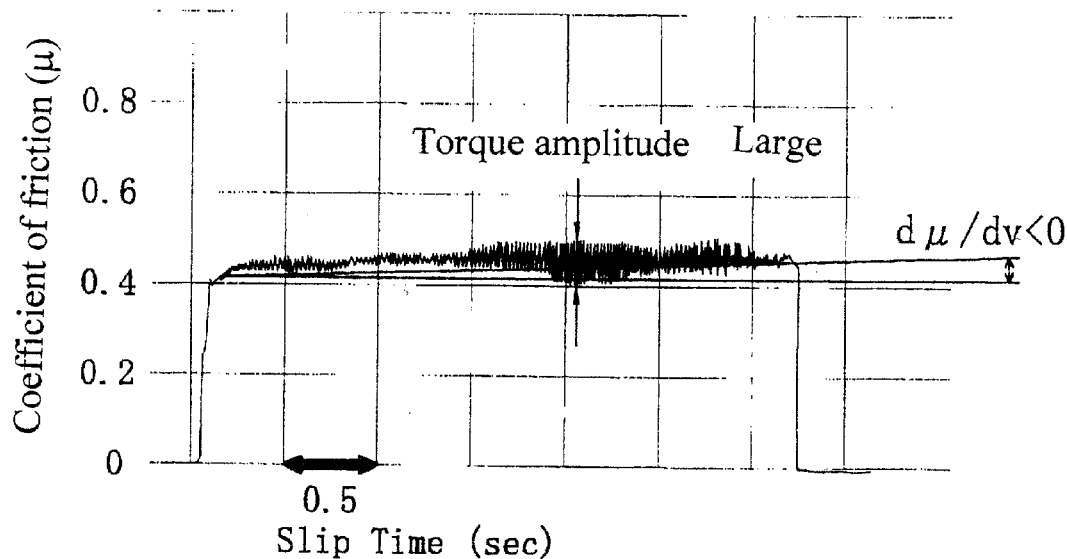
FIG. 6 is a graph of the torque waveform measurement results for a conventional friction material.
Figure 7:
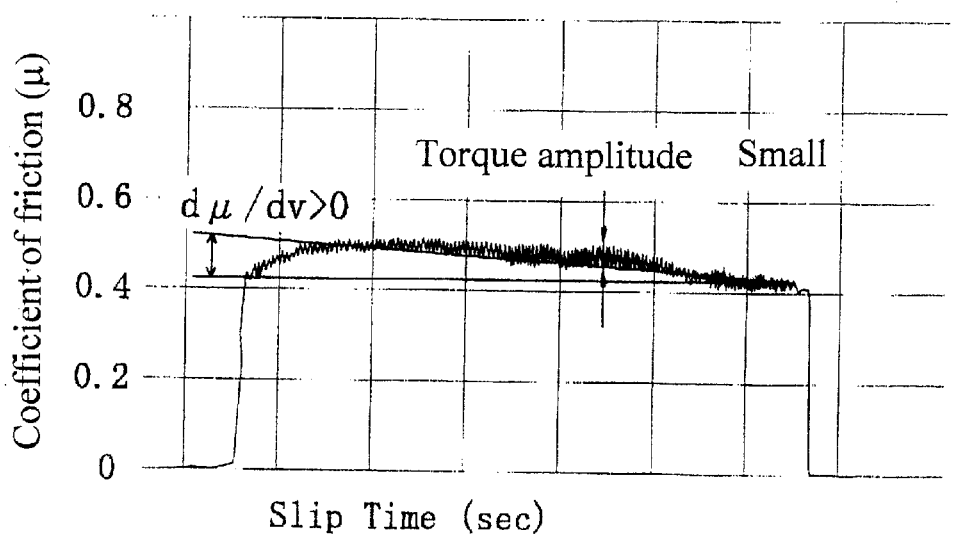
FIG. 7 is a graph of the torque waveform measurement results for a friction material of the present invention.

A conventional friction material and a friction material in accordance with the present invention were mounted to rotating bodies and used to transmit torque to a mating material by means of friction. The measurement results of the torque waveform are shown in FIGS. 6 and 7. As shown in FIGS. 6 and 7, the torque amplitude is smaller for the friction material of the present invention than for the conventional friction material. Also, while the $\mu$-v characteristic of the conventional friction material has a negative slope, that of the friction material of the present invention has a positive slope.

Due to these differences, when the friction material of the present invention is used as the friction facing of a clutch, less juddering occurs and the acceleration feel is improved in comparison with conventional friction materials.

CHARACTERISTICS OF THE FRICTION MATERIAL

In the present invention, 1 to 20 wt % of graphite is included as a lubricating ingredient and 1 to 15 wt % of ceramic having a particle size from 50 to 200 $\mu$m is included to secure frictional resistance retention and wear resistance.

In order to improve the lubrication in comparison to conventional friction materials, the graphite is arranged in a layer-like form. With the graphite arranged in a layer-like form, the layers peel off one by one when the frictional sliding causes the graphite to exfoliate. Therefore, lubrication is maintained even if some of the graphite exfoliates.

The particle size of the graphite is set to 50 μm to 200 μm because it is extremely difficult to arrange the graphite in a layer-like form if the particle size is smaller than 50 μm and there is to much slipping if the particle size is larger than 200 μm.

In the present invention, natural graphite, which is easy to arrange in layer-like form (readily assumes a layer-like form), is contained in the friction material as a lubricating substance. As a result, the graphite is successfully arranged in a layer-like form and the lubrication can be improved in comparison with conventional friction materials without using lead and other harmful substances.

Additionally, the μ-v characteristic of the friction material is given a positive slope by adjusting the content and particle size of the graphite. Thus the occurrence of juddering is suppressed.

In the present invention, 1 to 20 wt % of graphite arranged in a layer-like form is included in the friction material as a lubricating ingredient. Therefore, lubrication is maintained even if some of the graphite exfoliates due to frictional sliding. Since the particle size of the graphite is set to 50 μm to 200 μm, the graphite can be successfully arranged in a layer-like form while also achieving an appropriate degree of slipping (lubrication). Thus, with the present invention, the lubrication can be improved in comparison with conventional friction materials and the μ-v characteristic of the friction material can be improved without using lead and other harmful substances.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A friction material comprising:
   a metal alloy of at least one of a copper alloy and an iron alloy;
   graphite having a particle size of about 50 μm to about 200 μm, said graphite having scales arranged in a layer form horizontal to a surface of said friction material, said graphite being about 1 to about 20 wt % of said friction material; and
   ceramic having a particle size of about 50 μm to about 200 μm, said ceramic being about 1 to about 15 wt % of said friction material.

2. A friction material as recited in claim 1, wherein said graphite is natural graphite.

3. A friction material as recited in claim 2, wherein said ceramic is a single substance selected from silica, mullite and zircon sand.

4. A friction material as recited in claim 2, wherein said ceramic is a composite containing at least two of silica, mullite and zircon sand.

5. A friction material as recited in claim 1, wherein said ceramic is a single substance selected from silica, mullite and zircon sand.

6. A friction material as recited in claim 1, wherein said ceramic is a composite containing at least two of silica, mullite and zircon sand.

7. A friction material as recited in claim 1, wherein said graphite has a particle size of about 80–150 μm and about 8 wt %.

8. A friction material as recited in claim 7, wherein said ceramic has particle size of about 90–150 μm and about 5 wt %.

9. A friction material as recited in claim 2 wherein said graphite has a particle size of about 80–150 μm and about 8 wt %.

10. A friction material as recited in claim 9, wherein said ceramic has particle size of about 90–150 μm and about 5 wt %.

11. A friction material as recited in claim 1, wherein said ceramic has particle size of about 90–150 μm and about 5 wt %.

12. A friction material as recited in claim 3, wherein said ceramic has particle size of about 90–150 μm and about 5 wt %.

13. A friction material as recited in claim 5, wherein said ceramic has particle size of about 90–150 μm and about 5 wt %.

14. A friction material as recited in claim 1, wherein said ceramic consists essentially of silica and has a particle size of about 90–150 μm and about 5 wt %.

* * * * *